US 12,469,159 B2

(12) United States Patent
Kronman et al.

(10) Patent No.: US 12,469,159 B2
(45) Date of Patent: Nov. 11, 2025

(54) SYSTEMS AND METHODS FOR MESH AND TACK DIAGNOSIS

(71) Applicant: Visionsense Ltd., Petah Tikva (IL)

(72) Inventors: Achia Kronman, Pardes Hannah (IL); Rami Cohen, Misgav Regional Council (IL); Ohad Doron, Herzelia (IL); Amit Ruf, Hod Hasharon (IL); Daniella Ziv, Tel Aviv (IL); Elisha Rabinovitz, Haifa (IL); Gaetan Guerin, Lyons (FR); Tal Davidson, Yokneam (IL)

(73) Assignee: Visionsense Ltd., Petah Tikva (IL)

( * ) Notice: Subject to any disclaimer, the term of this patent is extended or adjusted under 35 U.S.C. 154(b) by 449 days.

(21) Appl. No.: 17/922,983

(22) PCT Filed: May 25, 2021

(86) PCT No.: PCT/IL2021/050614
§ 371 (c)(1),
(2) Date: Nov. 3, 2022

(87) PCT Pub. No.: WO2021/245648
PCT Pub. Date: Dec. 9, 2021

(65) Prior Publication Data
US 2023/0237685 A1 Jul. 27, 2023

Related U.S. Application Data

(60) Provisional application No. 63/033,613, filed on Jun. 2, 2020.

(51) Int. Cl.
*G06T 7/62* (2017.01)
*G06T 7/00* (2017.01)

(52) U.S. Cl.
CPC .............. *G06T 7/62* (2017.01); *G06T 7/0012* (2013.01); *G06T 2207/10068* (2013.01); *G06T 2207/30052* (2013.01)

(58) Field of Classification Search
CPC ................................ G06T 7/62; G06T 7/0012
(Continued)

(56) References Cited

U.S. PATENT DOCUMENTS 8,897,523 B2 * 11/2014 Satish ....................... G06T 7/62
382/128
10,762,636 B2 * 9/2020 Gering ................ G06F 18/2115
(Continued)

OTHER PUBLICATIONS

International Search Report mailed Oct. 4, 2021 and Written Opinion completed Sep. 17, 2021 corresponding to counterpart Int'l Patent Application PCT/IL2021/050614.
(Continued)

*Primary Examiner* — William D Titcomb
(74) *Attorney, Agent, or Firm* — Carter, DeLuca & Farrell LLP

(57) ABSTRACT

A system for surgical mesh analysis includes a display screen, a processor, and a memory. The memory has instructions stored thereon, which when executed by the processor, cause the system to: access an image of a surgical site (602). The image includes the surgical mesh. The surgical mesh includes a grid of cells. The instructions, when executed by the processor further cause the system to detect a first desired location on the surgical mesh in the image (604); detect a second desired location on the surgical mesh in the image (606); determine a distance between the first desired location and the second desired location along the surgical mesh in the image (608); and display, on the display screen, the determined distance (610).

17 Claims, 15 Drawing Sheets

(58) Field of Classification Search
USPC .......................................................... 382/128
See application file for complete search history.

(56) References Cited

U.S. PATENT DOCUMENTS

| | | | |
|---|---|---|---|
| 11,274,929 B1* | 3/2022 | Afrouzi | G06T 7/30 |
| 12,249,062 B2* | 3/2025 | Tan | G06V 10/755 |
| 2019/0318484 A1* | 10/2019 | Dougherty | G06T 7/11 |
| 2019/0365480 A1* | 12/2019 | Gopinath | A61B 5/4851 |
| 2019/0374155 A1* | 12/2019 | Wang | A61B 1/2736 |
| 2020/0364929 A1* | 11/2020 | Li | G06T 7/62 |
| 2022/0036578 A1* | 2/2022 | Munsey, Jr. | G06T 7/75 |

OTHER PUBLICATIONS

Shademan Azad et al., "Plenoptic cameras in surgical robotics: Calibration, registration, and evaluation", 2016 IEEE International Conference on Robotics and Automation (ICRA), IEEE, May 16, 2016 (May 16, 2016), p. 708-714, XP032908267, DOI: 10.1109/ICRA.2016.7487197 external link [retrieved on Jun. 8, 2016]. https://ieeexplore.ieee.org/document/7487197. Relevant to Claim Nos. 1-22.

Jagannathan Anand, "Suture training device with computer vision based information acquisition", ISBN: 9781369549874, Jan. 1, 2016 (Jan. 1, 2016), p. 1-87, Retrieved from the Internet: URL:https://tigerprints.clemson.edu/cgi/viewcontent.cgi?article=3588&context=all_theses XP055841612, ISBN: 9781369549874 [retrieved on Sep. 16, 2021]. Relevant to Claim No. 20.

\* cited by examiner

SYSTEMS AND METHODS FOR MESH AND TACK DIAGNOSIS

CROSS-REFERENCE TO RELATED APPLICATIONS

The present application is a U.S. National Stage Application filed under 35 U.S.C. § 371 (a) claiming the benefit of and priority to International Patent Application No. PCT/IL2021/050614, filed May 25, 2021, which claims the benefit of and priority to U.S. Provisional Patent Application Ser. No. 63/033,613, filed Jun. 2, 2020, the entire disclosures of each of which being incorporated by reference herein.

FIELD

This disclosure relates generally to meshes and, in particular, meshes used in medical treatment.

BACKGROUND

Hernia mesh, or surgical mesh, is a medical device that supports damaged tissue around hernias as it heals. Surgeons, for example, during hernia surgery, or laparoscopic surgery, place the mesh across the area surrounding the hernia, attaching it with tacks, stitches, staples, or glue. Pores in the mesh allow the tissue to grow into the device. There is a high chance of hernias returning after repair surgery. It would aid surgeons to diagnose and/or determine mesh and tack placement. Accordingly, a continuing need exists for mesh and tack diagnosis.

SUMMARY

In accordance with the disclosure, a system for surgical mesh analysis is presented. The system includes a display screen, a processor, and a memory. The memory has instructions stored thereon, which when executed by the processor, cause the system to: access an image of a surgical site. The image includes the surgical mesh. The surgical mesh includes a grid of cells. The instructions, when executed by the processor further cause the system to detect a first desired location on the surgical mesh in the image; detect a second desired location on the surgical mesh in the image; determine a distance between the first desired location and the second desired location along the surgical mesh in the image; and display, on the display screen, the determined distance.

In an aspect, the image may be obtained by an imaging device directed at the surgical mesh.

In another aspect, the accessed image may include a 2D image and/or a 3D image.

In an aspect, when executing the instructions to determine the distance between the first desired location and the second desired location, the instructions may further cause the system to: determine a number of cells of the grid of cells along a shortest distance between the first desired location and the second desired location; perform a Euclidean reconstruction based on analyzing the surgical mesh as a 3D structure and/or a 2D structure composed of polygons, each polygon corresponding to a unique cell of the grid of cells; and/or perform a geodesic reconstruction based on analyzing the surgical mesh by forming a topographic map of the surgical mesh and calculating distances between the first desired location and the second desired location based thereon.

In another aspect, the instructions, when executed by the processor, may further cause the system to identify an item located on the surgical mesh.

In yet another aspect, the item may include a tack configured for attaching the surgical mesh to a tissue.

In still yet another aspect, the instructions, when executed by the processor, may further cause the system to identify, based on the image, whether the surgical mesh is attached to the tissue by a tack located at a location along the surgical mesh.

In still yet another aspect, the surgical site may be a hernia surgical site and/or a laparoscopy surgical site.

In still yet another aspect, the instructions, when executed by the processor, may further cause the system to display on the display screen a pre-selected placement of tacks on the surgical mesh.

In accordance with aspects of the disclosure, the instructions, when executed by the processor, may further cause the system to: determine at least one placement location for at least one tack; and display the determined at least one placement location on the display screen.

In another aspect, displaying, on the display screen, the determined distance may further include displaying a trajectory between the first desired location and the second desired location.

In accordance with the disclosure, a computer-implemented method for surgical mesh analysis is presented. The method includes: accessing an image of a surgical site, the image including the surgical mesh. The surgical mesh includes a grid of cells. The method further includes detecting a first desired location on the surgical mesh in the image, detecting a second desired location on the surgical mesh in the image, determining a distance between the first desired location and the second desired location along the surgical mesh in the image, and displaying, on the display, the determined distance.

In an aspect, the method may further include using an imaging device directed at the surgical mesh to obtain the image.

In another aspect, the accessing of the image may include accessing a 2D image and/or a 3D image.

In yet another aspect, determining the distance between the first desired location and the second desired location may further include determining a number of cells of the grid of cells along a shortest distance between the first desired location and the second desired location; performing a Euclidean reconstruction based on analyzing the surgical mesh as a 3D structure composed of polygons, each polygon corresponding to a unique cell of the grid of cells; and/or performing a geodesic reconstruction based on analyzing the surgical mesh by forming a topographic map of the surgical mesh and calculating a distances between the first desired location and the second desired location based thereon.

In still yet another aspect, the method may further include identifying an item located on the surgical mesh.

In still yet another aspect, the method may further include determining placement locations for one or more tacks and displaying the determined placement locations.

In still yet another aspect, the method may further include identifying, based on the image, when the surgical mesh is attached to the tissue by a tack located at a location along the surgical mesh.

In accordance with other aspects of the disclosure, a computer-implemented method for surgical mesh analysis, using at least one processing unit. The method includes: accessing an image of a surgical site, the image including the surgical mesh. The surgical mesh includes a grid of cells.

The method further includes detecting a first desired location on the surgical mesh in the image, detecting a second desired location on the surgical mesh in the image, determining a distance between the first desired location and the second desired location along the surgical mesh in the image, and displaying, on the display, the determined distance.

BRIEF DESCRIPTION OF DRAWINGS

Various aspects of the disclosure are described herein with reference to the drawings wherein.

Figure 1:
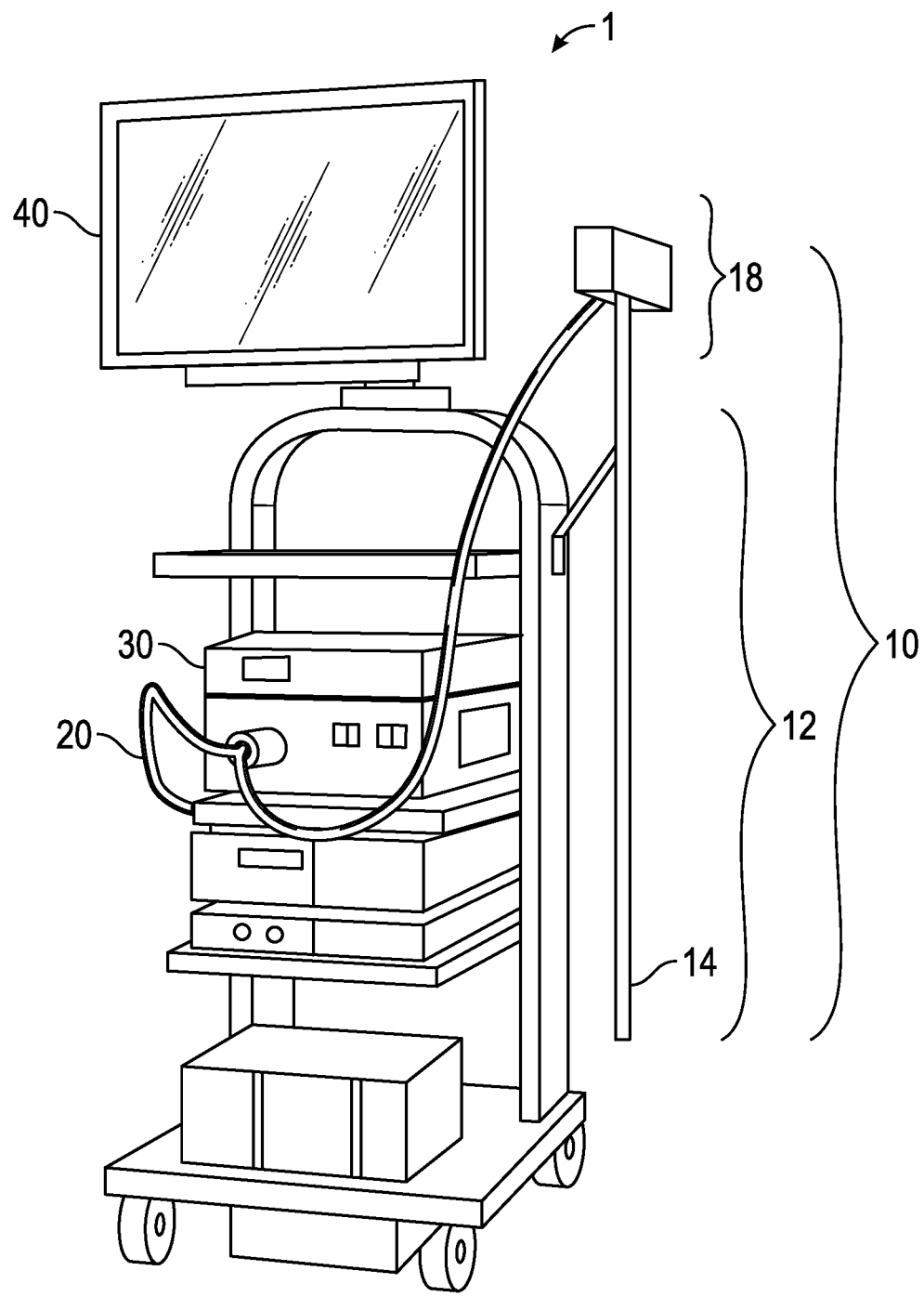
FIG. 1 is a diagram of an exemplary visualization or endoscope system in accordance with the disclosure.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION

The disclosed surgical device will now be described in detail with reference to the drawings in which like reference numerals designate identical or corresponding elements in each of the several views. However, it is to be understood that the aspects of the disclosure are merely exemplary of the disclosure and may be embodied in various forms. Well-known functions or constructions are not described in detail to avoid obscuring the disclosure in unnecessary detail. Therefore, specific structural and functional details disclosed herein are not to be interpreted as limiting, but merely as a basis for the claims and as a representative basis for teaching one skilled in the art to variously employ the disclosure in virtually any appropriately detailed structure. In addition, directional terms such as front, rear, upper, lower, top, bottom, distal, proximal, and similar terms are used to assist in understanding the description and are not intended to limit the disclosure.

This disclosure relates generally to meshes and, in particular, meshes used in medical treatment.

Embodiments of the presently disclosed devices, systems, and methods of treatment are described in detail with reference to the drawings, in which like reference numerals designate identical or corresponding elements in each of the several views. As used herein, the term "distal" refers to that portion of a structure that is farther from a user, while the term "proximal" refers to that portion of a structure that is closer to the user. The term "clinician" refers to a doctor, nurse, or other care provider and may include support personnel.

The disclosure is applicable where images of a surgical site are captured. Endoscope systems are provided as an example, but it will be understood that such description is exemplary and does not limit the scope and applicability of the disclosure to other systems and procedures.

Figure 2:
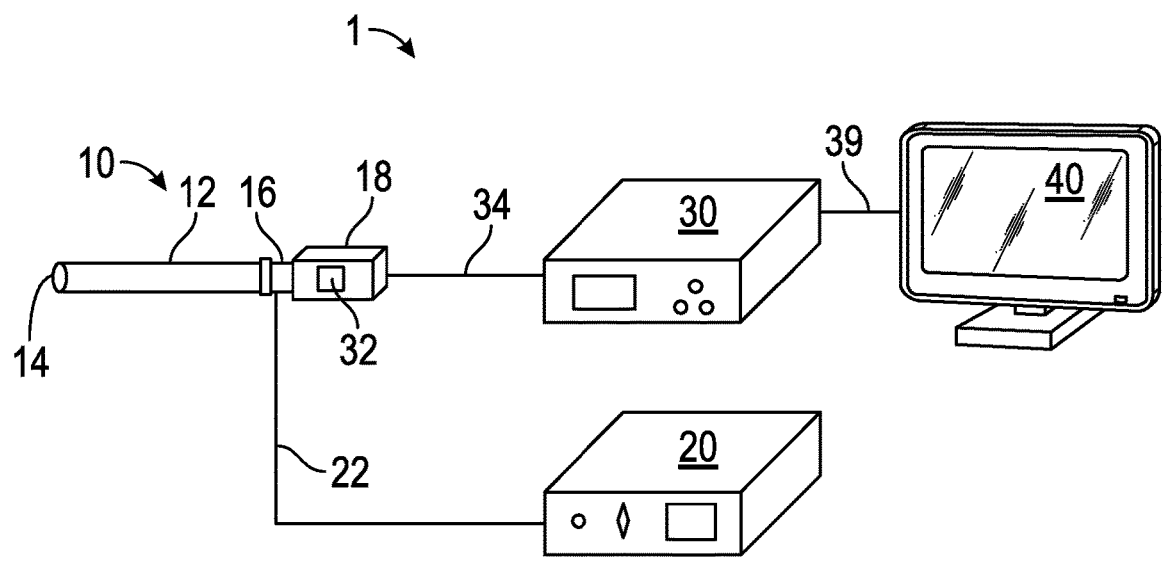
FIG. 2 is a schematic configuration of the visualization or endoscope system of FIG. 1.
Figure 3:
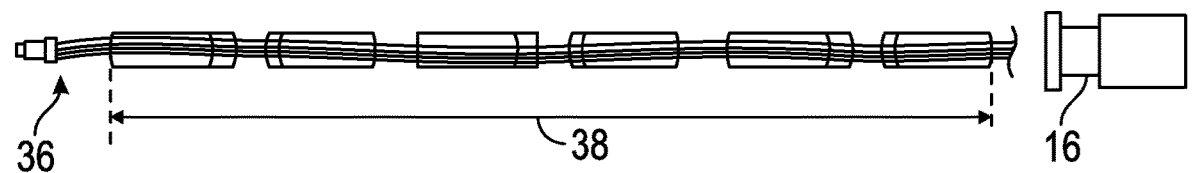
FIG. 3 is a diagram illustrating another schematic configuration of an optical system of the system of FIG. 1.

Referring initially to FIGS. 1-3, an endoscope system 1, in accordance with the disclosure, includes an endoscope 10, a light source 20, a video system 30, and a display device 40. With continued reference to FIG. 1, the light source 20, such as an LED/Xenon light source, is connected to the endoscope 10 via a fiber guide 22 that is operatively coupled to the light source 20 and to an endocoupler 16 disposed on, or adjacent to, a handle 18 of the endoscope 10. The fiber guide 22 includes, for example, fiber optic cable which extends through the elongated body 12 of the endoscope 10 and terminates at a distal end 14 of the endoscope 10. Accordingly, light is transmitted from the light source 20, through the fiber guide 22, and emitted out the distal end 14 of the endoscope 10 toward a targeted internal feature, such as tissue or an organ, of a body of a patient. As the light transmission pathway in such a configuration is relatively long, for example, the fiber guide 22 may be about 1.0 m to about 1.5 m in length, only about 15% (or less) of the light flux emitted from the light source 20 is outputted from the distal end 14 of the endoscope 10.

With reference to FIGS. 2 and 3, the video system 30 is operatively connected to an image sensor 32 mounted to, or disposed within, the handle 18 of the endoscope 10 via a data cable 34. An objective lens 36 is disposed at the distal end 14 of the elongated body 12 of the endoscope 10 and a series of spaced-apart, relay lenses 38, such as rod lenses, are positioned along the length of the elongated body 12 between the objective lens 36 and the image sensor 32.

Images captured by the objective lens 36 are forwarded through the elongated body 12 of the endoscope 10 via the relay lenses 38 to the image sensor 32, which are then communicated to the video system 30 for processing and output to the display device 40 via cable 39. The image sensor 32 is located within, or mounted to, the handle 18 of the endoscope 10, which can be up to about 30 cm away from the distal end 14 of the endoscope 10.

Figure 4:
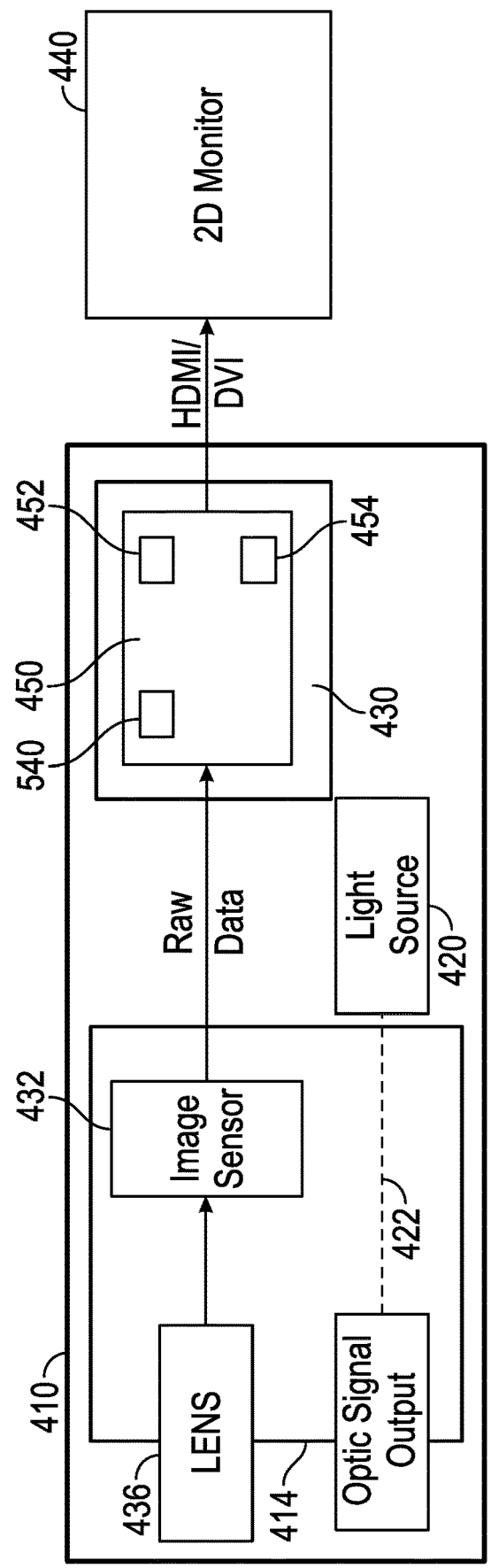
FIG. 4 is a schematic configuration of the visualization or endoscope system in accordance with an aspect of the disclosure.

Referring to FIG. 4, there is shown a schematic configuration of a system, which may be the endoscope system of FIG. 1 or may be a different type of system (e.g., visualization system, etc.). The system, in accordance with the disclosure, includes an imaging device 410, a light source 420, a video system 430, and a display device 440. The light source 420 is configured to provide light to a surgical site through the imaging device 410 via the fiber guide 422. The distal end 414 of the imaging device 410 includes an objective lens 436 for receiving or capturing the image at the surgical site. The objective lens 436 forwards or transmits the image to the image sensor 432. The image is then communicated to the video system 430 for processing. The video system 430 includes an imaging device controller 450 for controlling the endoscope and processing the images. The imaging device controller 450 includes a processor 452 connected to a computer-readable storage medium or a memory 454 which may be a volatile type memory, such as RAM, or a non-volatile type memory, such as flash media, disk media, or other types of memory. In various embodiments, the processor 452 may be another type of processor such as, without limitation, a digital signal processor, a microprocessor, an ASIC, a graphics processing unit (GPU), field-programmable gate array (FPGA), or a central processing unit (CPU).

In various embodiments, the memory 454 can be random access memory, read only memory, magnetic disk memory, solid state memory, optical disc memory, and/or another type of memory. In various embodiments, the memory 454 can be separate from the imaging device controller 450 and can communicate with the processor 452 through communication buses of a circuit board and/or through communication cables such as serial ATA cables or other types of cables. The memory 454 includes computer-readable instructions that are executable by the processor 452 to operate the imaging device controller 450. In various embodiments, the imaging device controller 450 may include a network interface 540 to communicate with other computers or a server.

Figure 5:
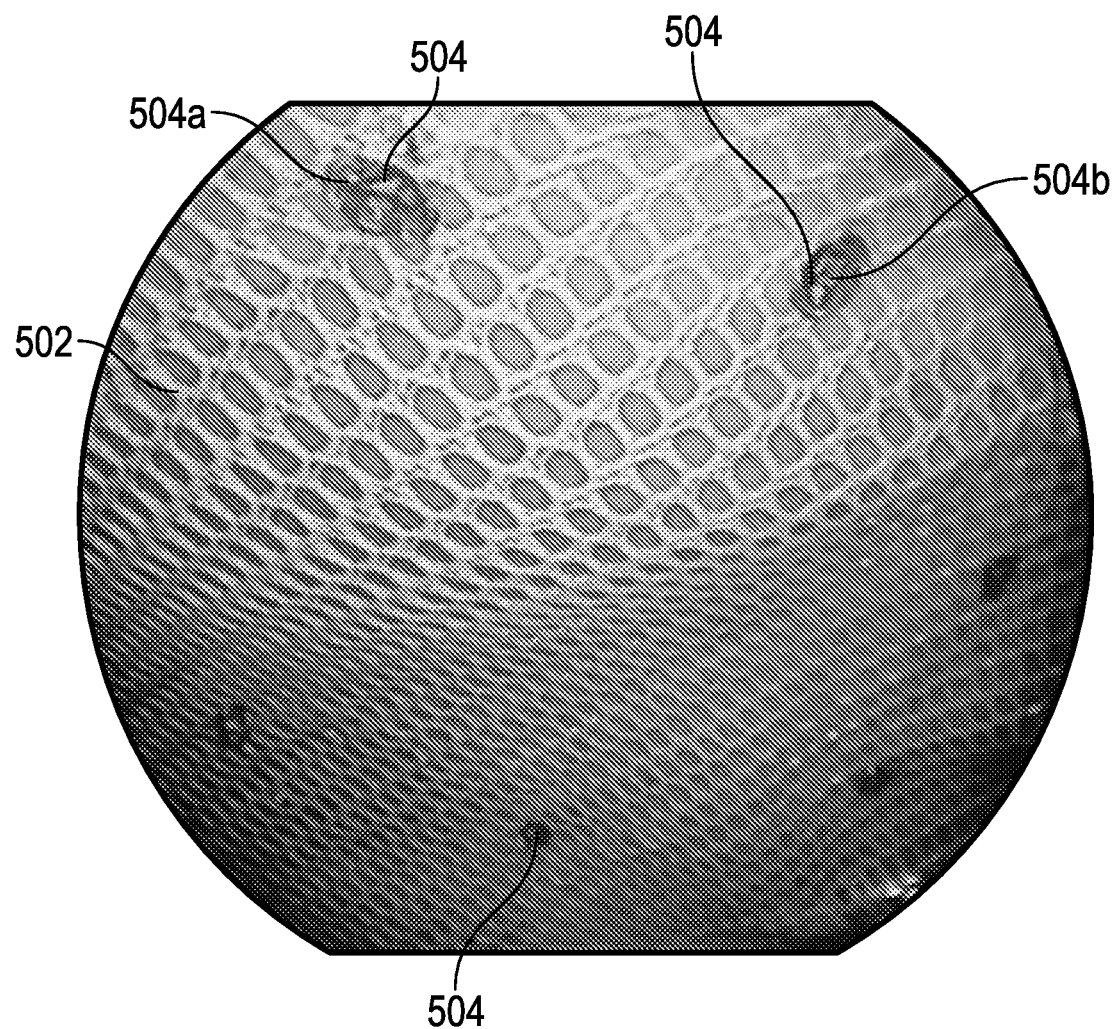
FIG. 5 is an image of a mesh attached to a tissue using tacks in accordance with the disclosure.

Referring to FIG. 5, an image of a surgical mesh 502 is shown, specifically, a mesh used for hernia treatment. A surgical mesh 502 is a medical device that supports damaged tissue around hernias as it heals. Clinicians, for example, during hernia surgery, or laparoscopic surgery, place the surgical mesh 502 across the area surrounding the hernia, attaching it with tacks 504. The disclosed method calculates the distance between two points along the surgical mesh 502, in this particular example, between the tacks 504a, 504b along the surgical mesh 502.

Figure 6:
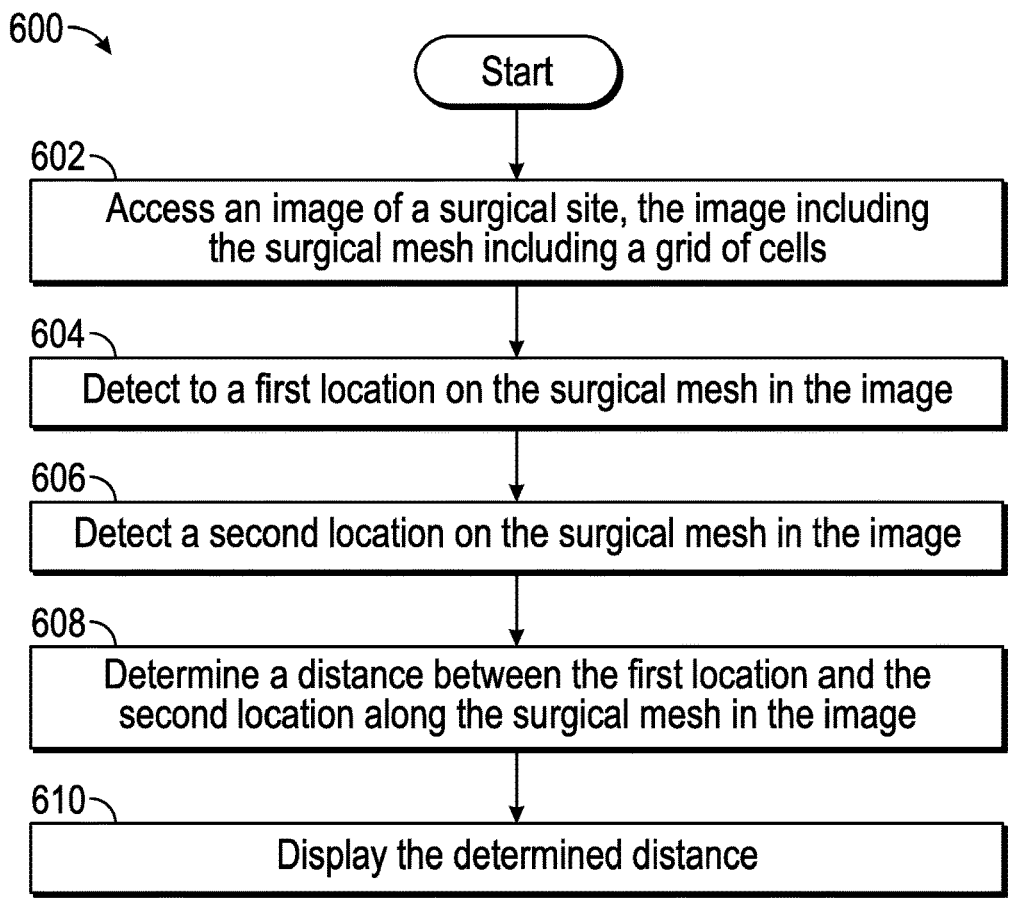
FIG. 6 is a flow diagram for a computer-implemented method for surgical mesh analysis in accordance with the disclosure.

With reference to FIG. 6, a flow diagram for a computer-implemented method for surgical mesh analysis is shown. For example, the systems and methods of the disclosure may determine distances between tacks and suggest optimized tack location. The flow diagrams include various blocks described in an ordered sequence. However, those skilled in the art will appreciate that one or more blocks of the flow diagram may be performed in a different order, repeated, and/or omitted without departing from the scope of the disclosure. The below description of the flow diagram refers to various actions or tasks performed by one or more video system 30, but those skilled in the art will appreciate that the video system 30 is exemplary. In various embodiments, the disclosed operations can be performed by another component, device, or system. In various embodiments, the video system 30 or other component/device performs the actions or tasks via one or more software applications executing on a processor. In various embodiments, at least some of the operations can be implemented by firmware, programmable logic devices, and/or hardware circuitry. Other implementations are contemplated to be within the scope of the disclosure.

Initially, at step 602, the video system 30 accesses an image of a surgical site from the imaging device (e.g., endoscope 10). The image includes a surgical mesh 502 (FIG. 5), which includes a grid of cells. For example, the image may include a surgical mesh in the form of a hernia mesh. The image may include a 2D or a 3D image. The surgical mesh 502 includes a known mesh structure. For example, parameters of the known mesh structure may include but are not limited to a spacing and/or a thickness of the grid of cells of the mesh. The parameters may be known to the video system 30 based on the type of surgical mesh 502 used in the procedure. These parameters of the known surgical mesh structure may be entered into the video system 30 by a clinician before and/or during a procedure.

Next, at step 604, the video system 30 detects a first desired location on the surgical mesh in the image, for example, a first tack 504a. Next, at step 606, the video system 30 detects a second desired location on the surgical mesh 502 in the image, for example, a second tack 504b. The video system 30 may use a machine learning network to detect the locations. The detection may be based on image segmentation and/or a recursive convolutional neural network (RCNN). For example, the image may be split into many different regions to check if any of the regions have signs of an object, such as a tack 504. In aspects, the locations may be manually entered into the video system 30, by a clinician using a user interface.

At step 608, the video system 30 determines a distance between the first desired location and the second desired location along the surgical mesh in the image. The determination of the distance may be based on one or more (e.g., a combination) of the following methods.

In aspects, the video system 30 may determine the distance between the first desired location and the second desired location distance by a 2D geodesic method. For example, the video system 30 may find the shortest path between two points along the mesh and calculate the number of cells of the grid of cells along that path. The determining of the 2D geodesic distance may be performed by the video system 30 according to the method of FIG. 7.

Figure 11:
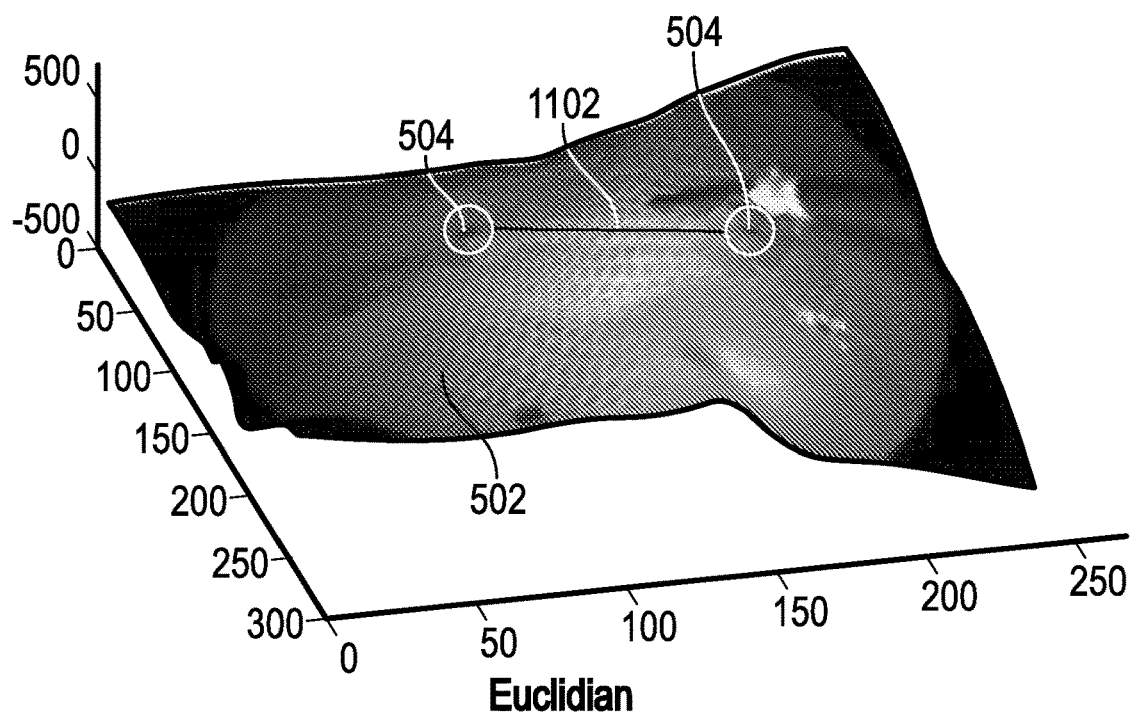
FIG. 11 is an image showing a 3D Euclidian distance method of FIG. 9 in accordance with the disclosure.

In aspects, the video system 30 may determine the distance between the first desired location and the second desired location by modeling the surgical mesh 502 as a polygon as structure (e.g., a 3D Euclidean reconstruction). The video system 30 performs a 3D Euclidean reconstruction based on analyzing the surgical mesh 502 as a 3D structure composed of polygons (FIG. 11). The video system 30 analyzes the surgical mesh 502 and extracts cells of the grid of cells as polygons. In aspects, each polygon corresponds to a unique cell of the grid of cells and has a specific size and orientation. In aspects, the mesh may be modeled as a 2D structure. In aspects, the video system 30 may detect an outer boundary of the mesh and determine the distance between points on the mesh from the outer boundary of the mesh. In aspects, the video system 30 may determine orientation of the cells. For example, determining the orientation of the cells may support analyzing a mesh with asymmetrical cells.

Figure 9:
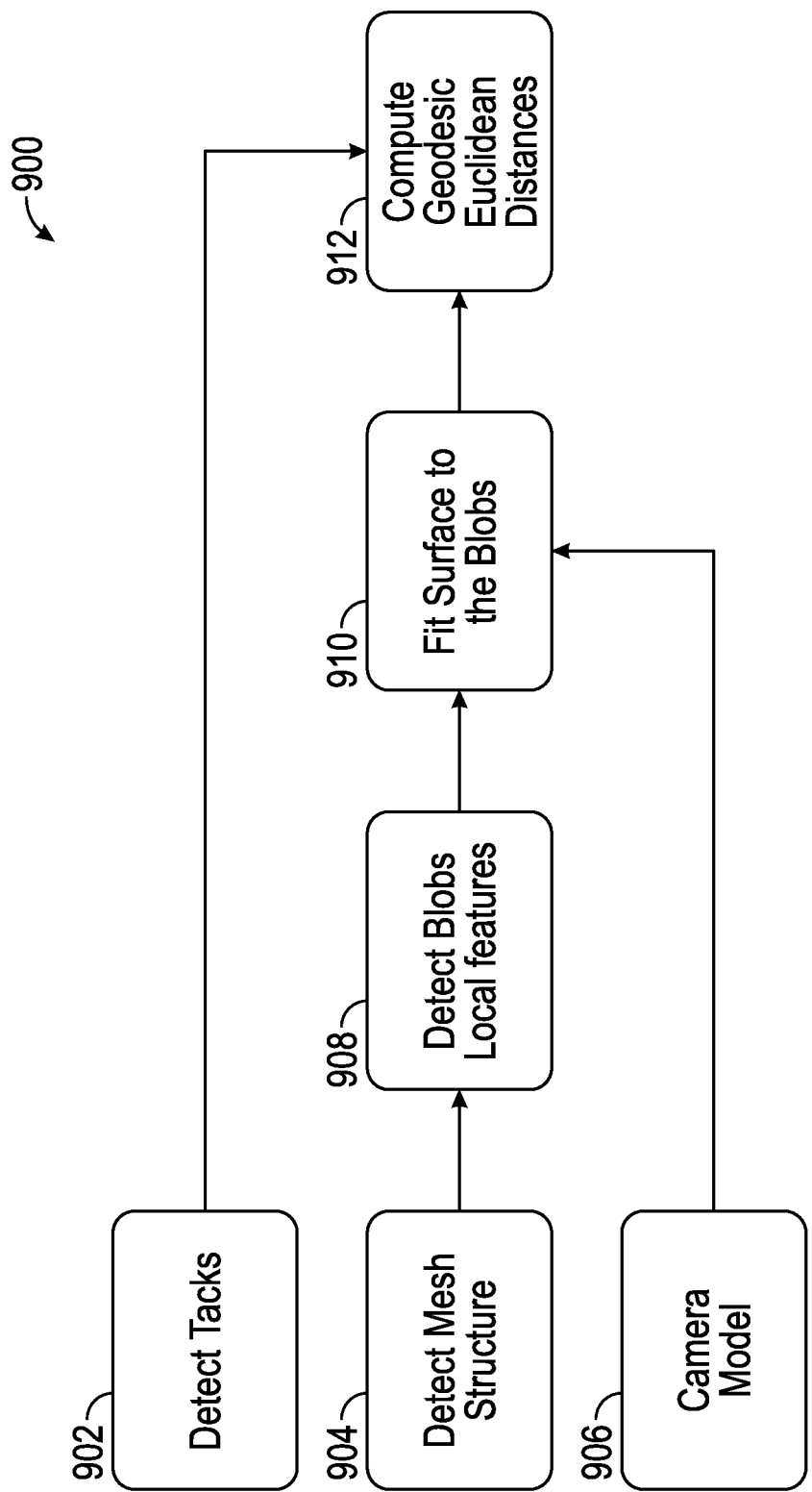
FIG. 9 is a flow diagram for a method for determining the 3D distance between two points on the surgical mesh.
Figure 10:
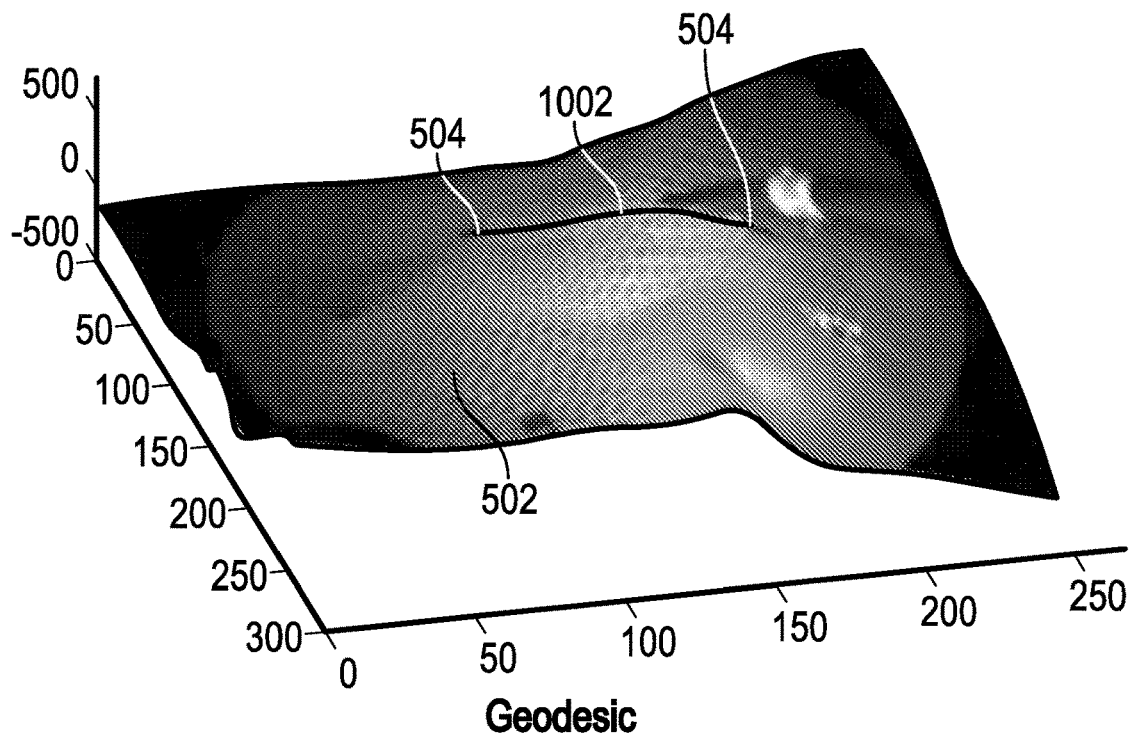
FIG. 10 is an image showing a 3D geodesic distance method of FIG. 9 in accordance with the disclosure.

In aspects, the video system 30 may determine the distance between the first desired location and the second desired location by performing a geodesic reconstruction (see FIG. 9). The geodesic reconstruction is based on analyzing the surgical mesh 502 by forming a topographic map of the surgical mesh and calculating a distance between the first desired location (e.g., a first tack) and the second desired location (e.g., a second tack) based thereon (FIG. 10). For example, a user can choose a first and a second desired location and the video system 30 can determine the distance between the two points. It is contemplated that determining the distance is not restricted to a quantitative analysis, e.g., displaying a number, and can also include determining a trajectory/route between two or more locations.

In aspects, the video system 30 may identify items located on the surgical mesh 502. For example, the video system 30 may identify a tack 504, which is configured for attaching the surgical mesh 502 to tissue. In aspects, the video system 30 may determine a pre-selected placement of tacks on the surgical mesh 502. In aspects, the video system 30 may determine placement locations for one or more tacks and display the determined placement locations (see FIG. 9).

Next, at step 610, the video system 30 displays, on the display device 40, the determined distance. In aspects, the determined distance may be displayed, for example as a number, or as a trajectory/route between the two desired locations.

Figure 7:
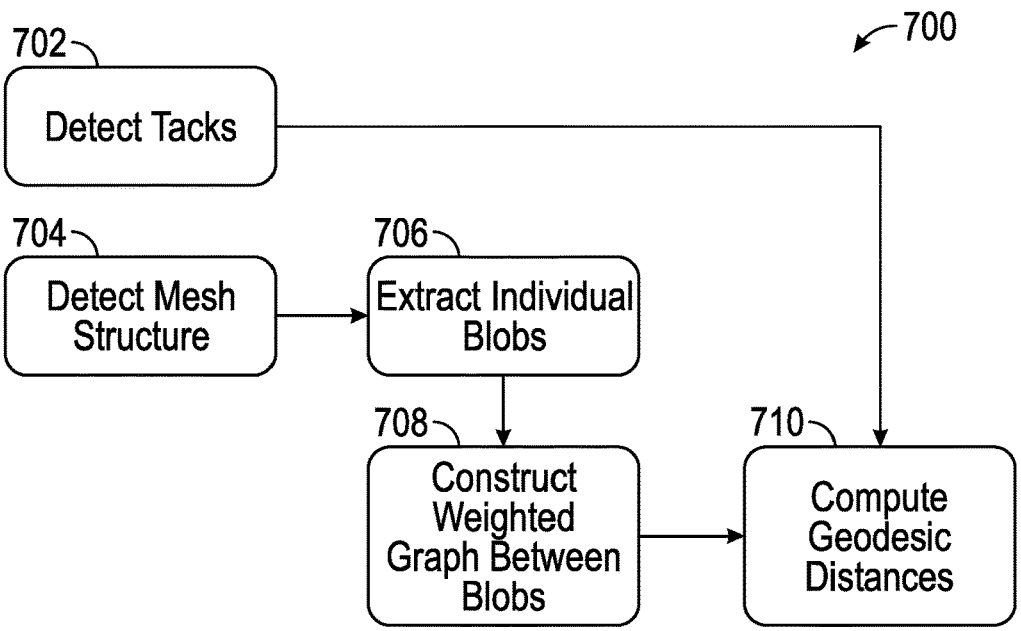
FIG. 7 a flow diagram showing a method of calculating a distance along the surgical mesh in accordance with the disclosure.

Referring to FIG. 7, a flow diagram for a 2D geodesic method for determining the distance between two points on the surgical mesh is shown. At a high level, the geodesic approach for measuring distance includes weighing pixels, arranging the pixels in blobs, and then determining the path crossing the minimal number of blobs between two given points along the mesh.

Figure 8:
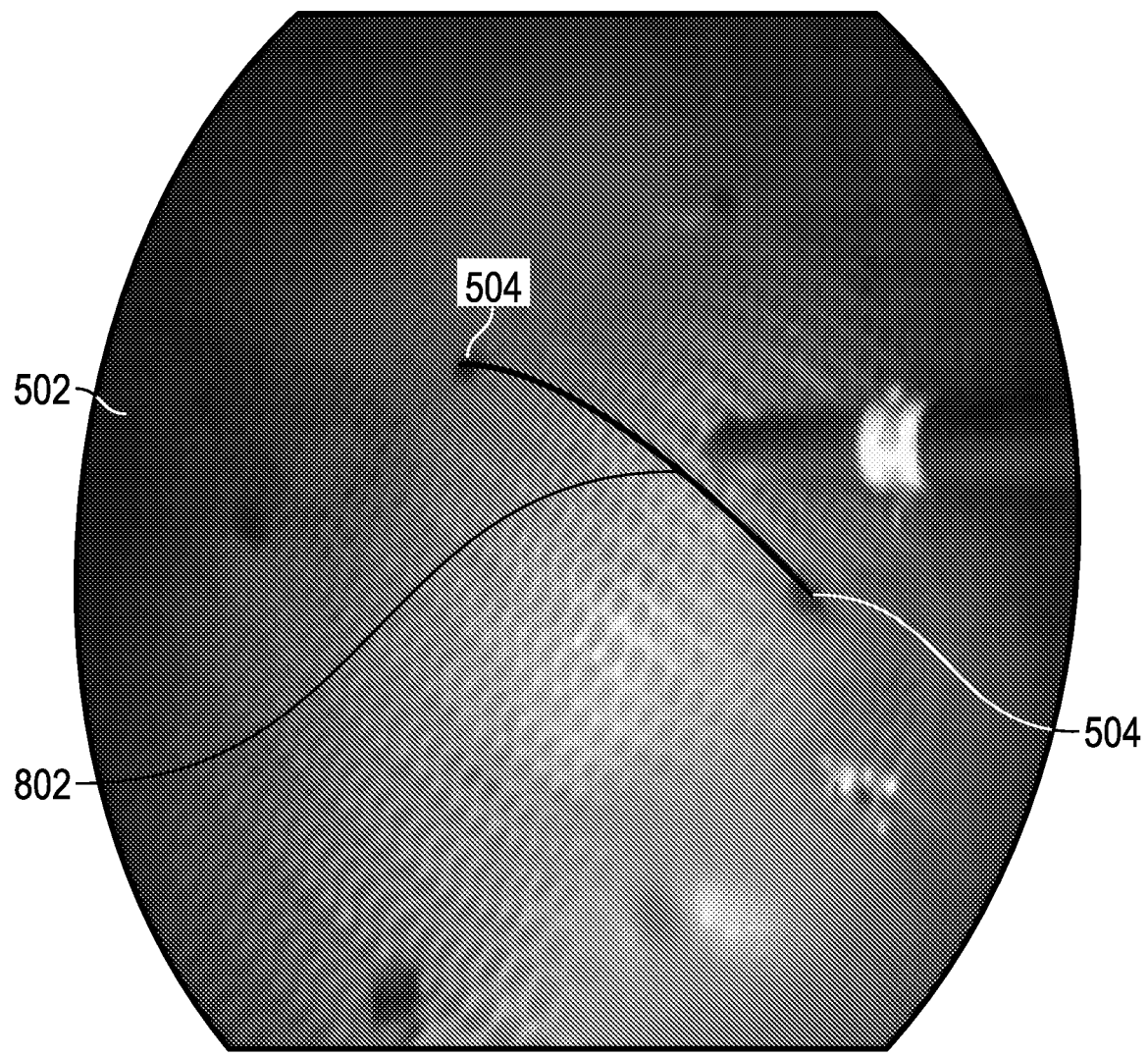
FIG. 8 is an image showing the method of FIG. 7 in accordance with the disclosure.

Initially, at step 704, the video system 30 detects the structure of the surgical mesh 502 (FIG. 8) in the image and determines weights for the pixels in the image. At step 706, the video system 30 then extracts BLOBs (Binary Large OBjects) by connecting neighboring pixels based on the weights of the pixels. A BLOB refers to a group of connected pixels in a binary image. The term "large" indicates that only objects of a certain size are of interest and that "small" binary objects are usually noise. Next, at step 708, the video system 30 constructs a weighted graph between BLOBs. In aspects, the video system 30 may penalize the weights of pixels that are not part of the same BLOB. At step 702, the video system 30 detects tacks 504 (FIG. 8) in the image. At step 710, the video system 30 then determines the 2D geodesic distance between the detected tacks by finding a path 802 (FIG. 8) that crosses the minimal number of BLOBs.

Figure 12:
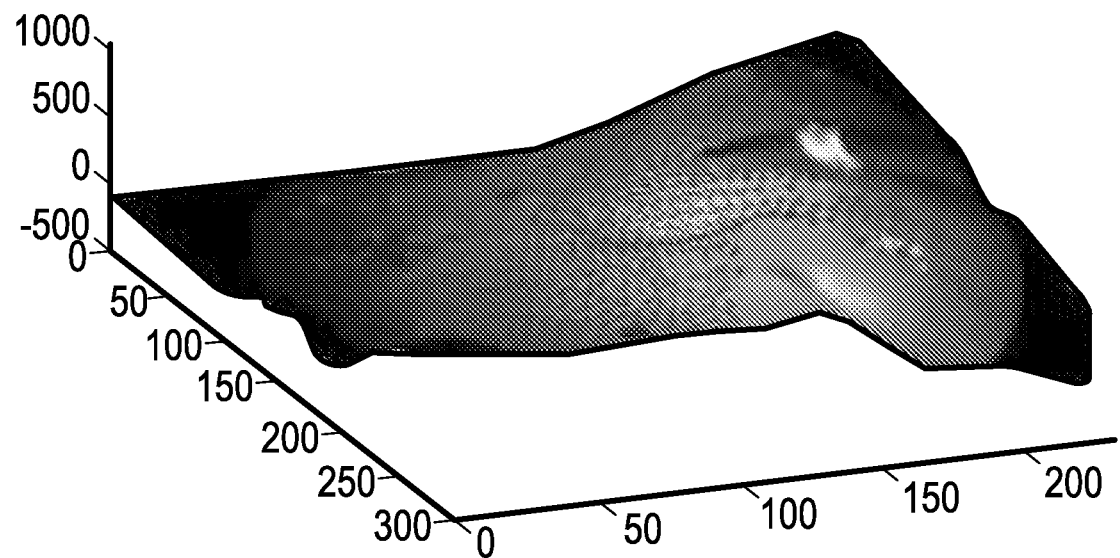
FIG. 12 is an image showing a 3D mesh reconstruction in accordance with the disclosure.
Figure 13:
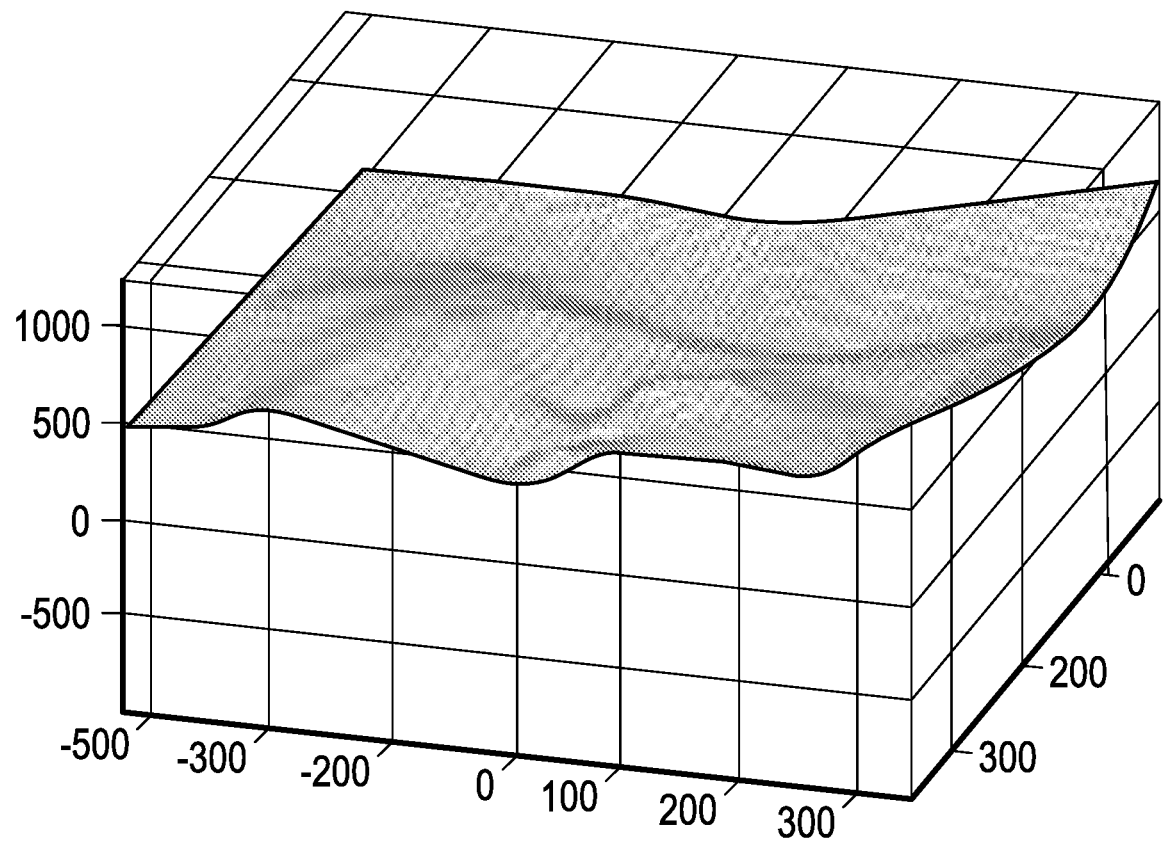
FIG. 13 is an image showing a fitting of a local linear surface on the reconstructed mesh of FIG. 12 in accordance with the disclosure.

Referring to FIG. 9, a flow diagram for a method for determining the 3D distance between two points on the surgical mesh is shown. Initially, at step 904, the video system 30 detects a structure of a surgical mesh 502 in the image. At step 908, the video system 30 models the 3D shape of the surgical mesh 502 by extracting BLOBs and providing a clean image of the mesh (FIG. 13). The video system 30 may fit an ellipse for each BLOB and find the axis for the ellipse. Next, the video system 30 may solve a PnP problem (Perspective-n-Point) to estimate each BLOB location. PnP is the problem of estimating the pose of a calibrated camera given a set of n 3D points in the world and their corresponding 2D projections in the image. For example, a camera model may be used to solve the PnP problem. Based on the solved PnP problem, the video system 30 may reconstruct the mesh as a 3D structure (FIG. 12). Next, at step 910, the video system 30 fits a local linear surface to the reconstructed mesh (see FIG. 13) and uses smoothness constraints to remove outlier pixels. At step 702, the video system 30 detects tacks 504 (FIGS. 10 and 11) in the image. Next, at step 912, the video system 30 determines the 3D distance (the Euclidian distance 1002 (FIG. 11) and/or the 3D geodesic distance 1102 (FIG. 10)) between the detected tacks based on the resulting mesh surface.

Figure 14A:
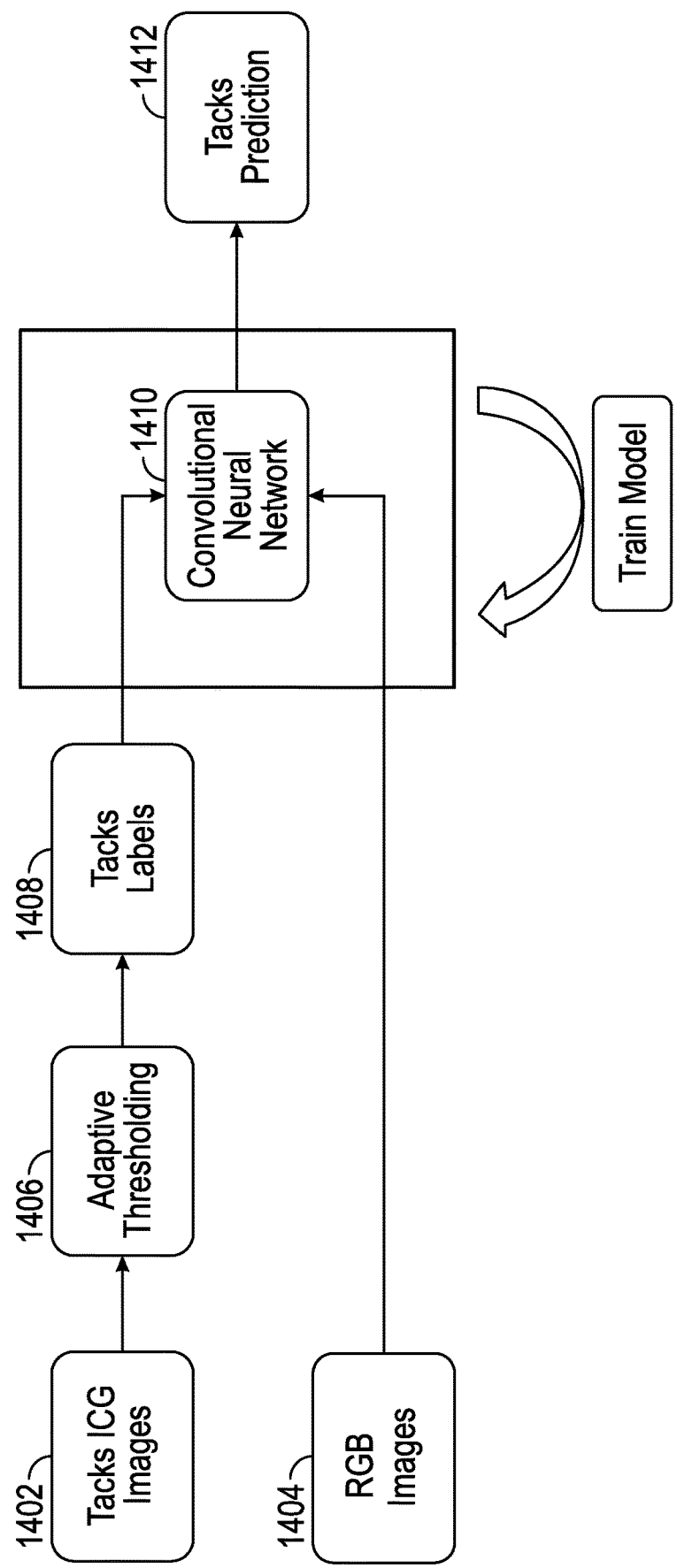
FIG. 14A is a flow diagram of a training of a neural network to predict tack location based on an RGB image in accordance with the disclosure.
Figure 14B:
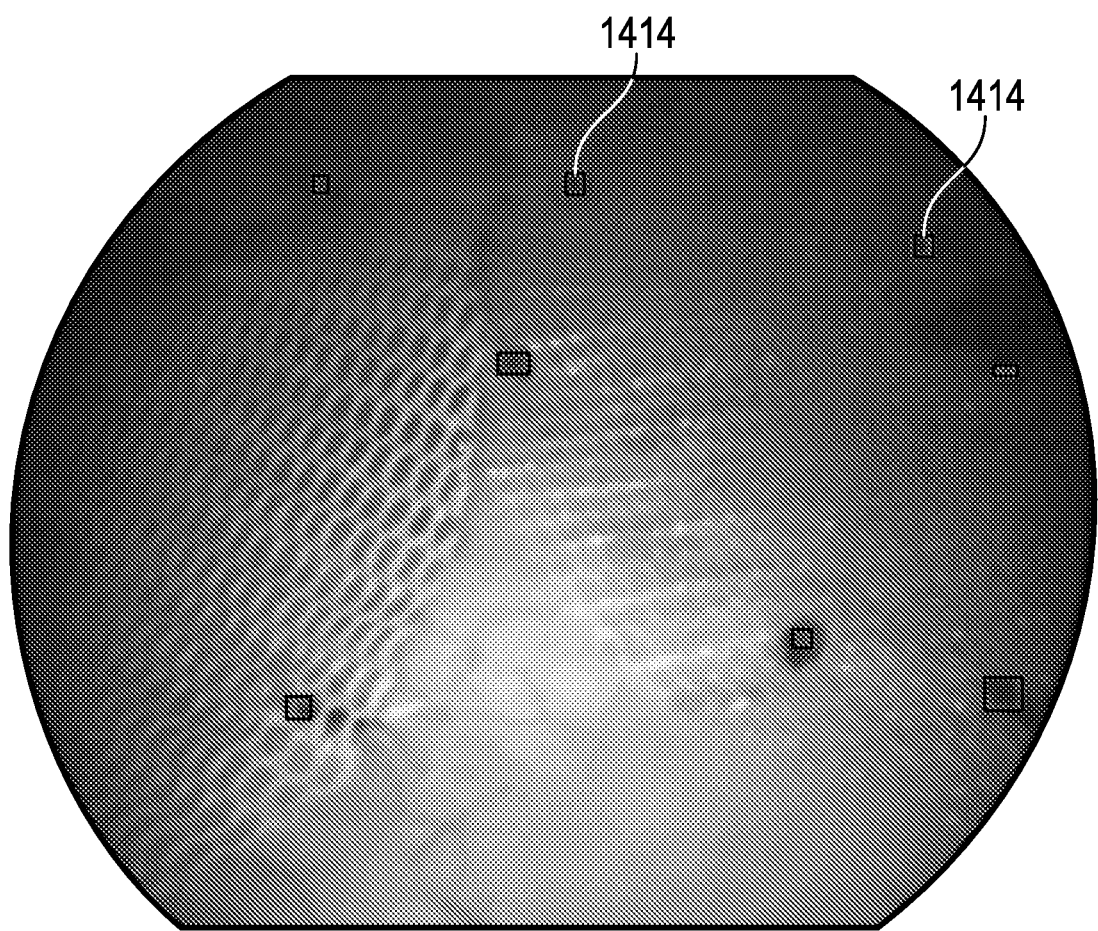
FIG. 14B is an image showing a surgical mesh with tacks, which may be used for training the neural network of FIG. 14A in accordance with the disclosure.

With reference to FIGS. 14A and 14B, a flow diagram for training a convolutional neural network (CNN) to predict a mesh structure of an RGB image that includes a surgical mesh is shown. A CNN is a type of deep learning neural network that is typically used in image processing and generally consists of an input and an output layer, as well as multiple hidden layers. The CNN may be trained using supervised training. For example, training images that include tacks are labeled and used to train the CNN (FIG. 14B). In aspects, the video system 30 may use a student-teacher cascade to predict labeling the training images. A student-teacher cascade generally consists of transferring "knowledge" from one machine learning model (i.e., the teacher network) to another (e.g., the student network). Commonly, the teacher network is a high-capacity model (e.g., a deep learning neural network) with formidable performance, while the student network is more compact. By transferring "knowledge," the system benefits from the student's compactness without sacrificing too much performance. For example, the deep learning neural network (e.g., a teacher) may produce soft labels and then using the soft labels to train the smaller neural network (e.g., a student). In aspects, the student-teacher cascade may include a combination of two or more deep learning networks (e.g., a CNN), classical machine learning models (e.g., an SVM, a decision tree, etc.), and/or computer vision models.

Figure 15:
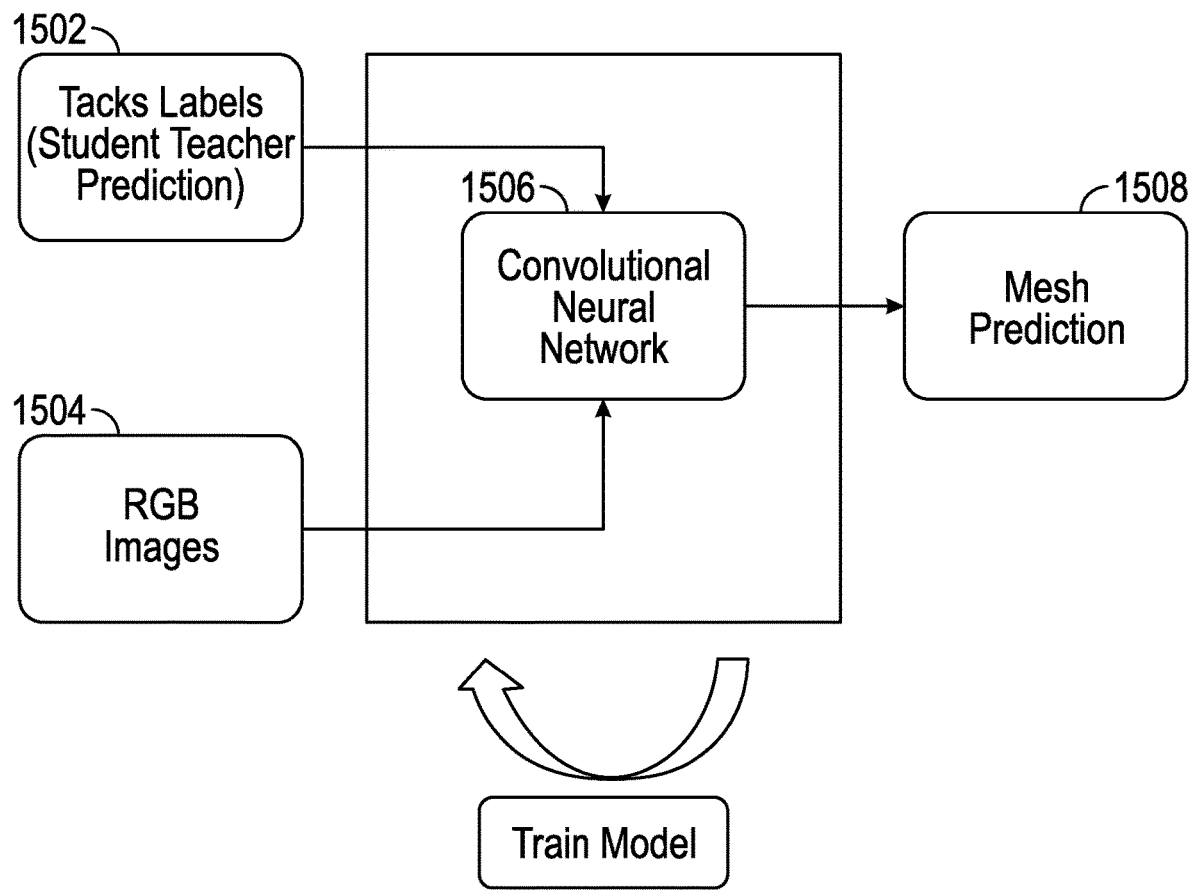
FIG. 15 is a flow diagram of a training of a neural network to predict mesh structure based on an RGB image in accordance with the disclosure.
Figure 16:
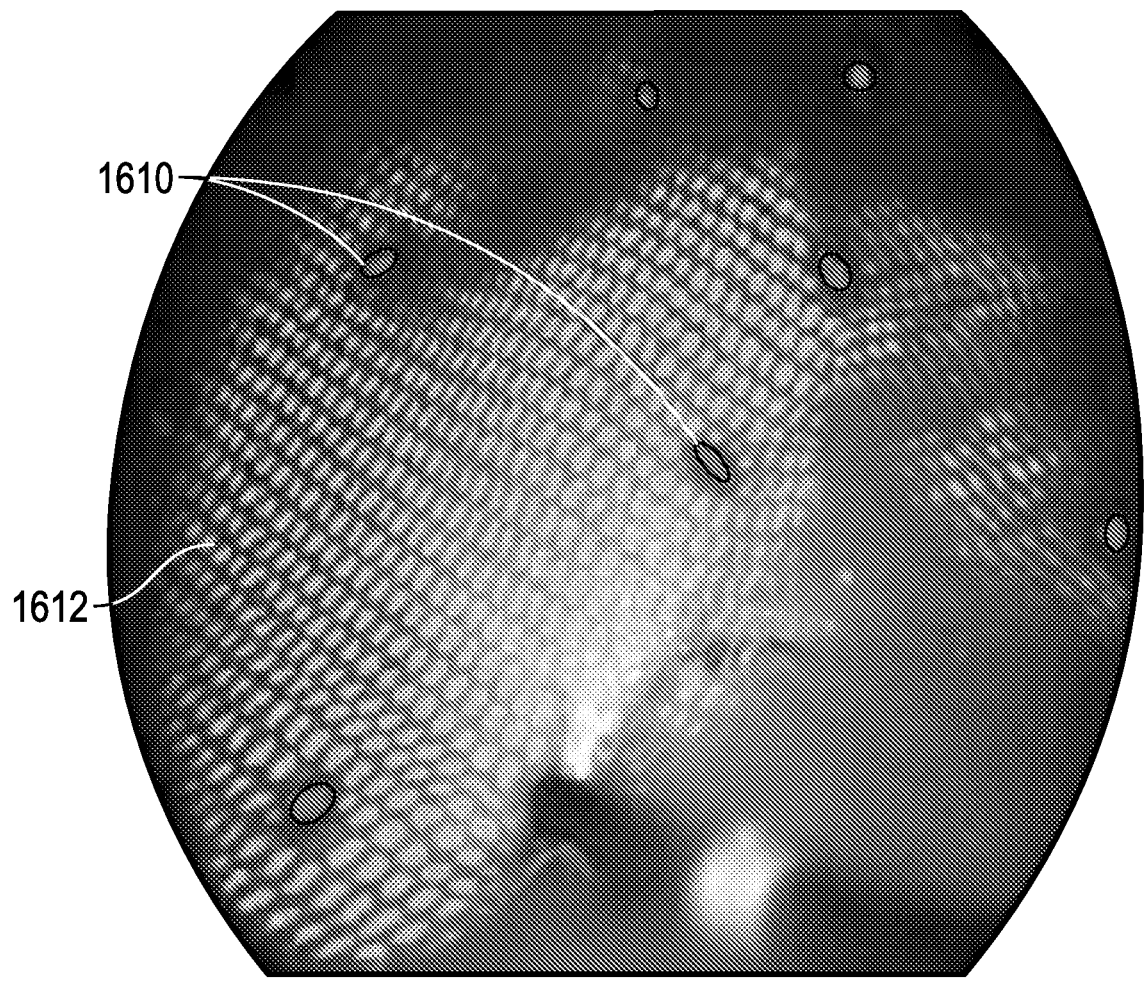
FIG. 16 depicts an image analyzed by the neural network of FIG. 15 in accordance with the disclosure.

Turning now to FIGS. 15 and 16, a CNN 1506 can be trained to predict the mesh structure 1508 using an image 1504, in which the tacks are labeled 1502. The CNN may be trained using a student-teacher prediction. The image of FIG. 16 demonstrates the image analyzed by the CNN 1506 (FIG. 15) in which the mesh 1612 and the tacks 1610 are shown.

Figure 17:
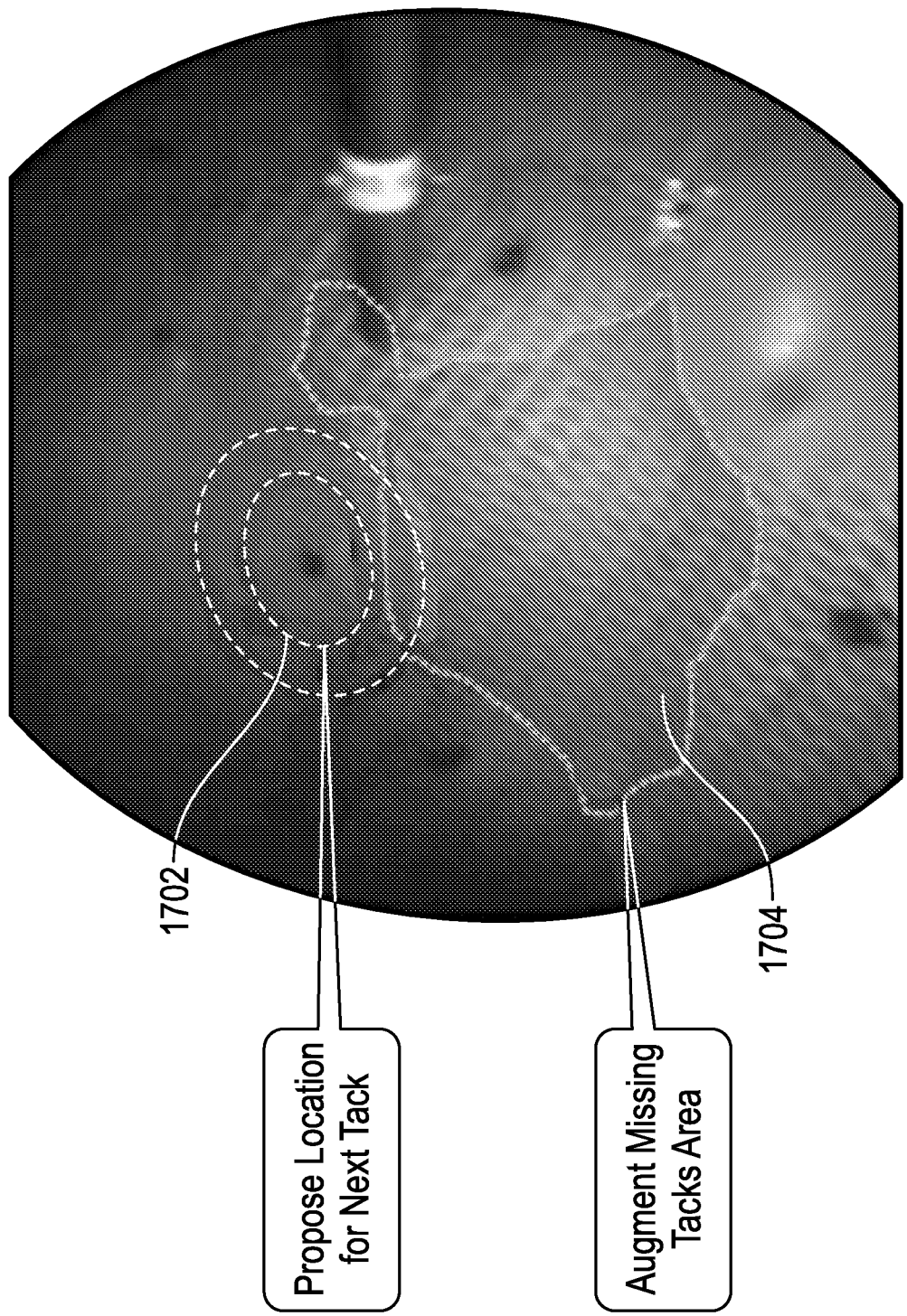
FIG. 17 depicts a view of a diagnosis of a mesh providing additional information about the mesh and tacks, in accordance with the disclosure.

FIG. 17 depicts a view of a diagnosis of a mesh providing additional information about the mesh and tacks, in accordance with the disclosure. In aspects, the image may be augmented to display a diagnosis. For example, during a procedure, the video system 30 may analyze the mesh and/or tack placement based on the determined distances between tacks and provide a diagnosis. In aspects, the video system 30 may determine a location for a clinician to install the next tack and display and augmented image showing an indication of the determined next tack location.

In addition, the video system may identify proper attachment of the mesh to a tissue using a tack. In particular, during placement of the tacks, it may so happen that instead of puncturing the mesh and firmly attaching the mesh to the tissue, the tack penetrates the mesh and, thereafter, lifts it above the tissue.

For example, the video system 30 may display a proposed tack location 1702 for the next tack. The displayed indication may include a graphic, such as, but not limited to, a target graphic. For example, the target graphic may have rings of various colors and/or animations indicating where the clinician should place the next tack. In aspects, the video system 30 may augment the image to display a "missing tack area" 1704. The missing tack area may include a colored graphic and/or animation indicating an area on the surgical mesh that the system decides should have additional tacks placed to properly support the surgical mesh. The system and method of the present disclosure may also be useful in predicting a desired location for placing the tacks, obtaining more data for quantitative accuracy evaluation, and developing alert/recommendation based on results. The results may be imaged onto the mesh using an augmented imaging system.

Since such a situation changes the topography of the 3D mesh model, the system may be configured for identifying such localized elevations and alerting the surgeon/physician and improper mesh attachment.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the disclosure in virtually any appropriately detailed structure. Like reference numerals may refer to similar or identical elements throughout the description of the figures.

Figure 18:
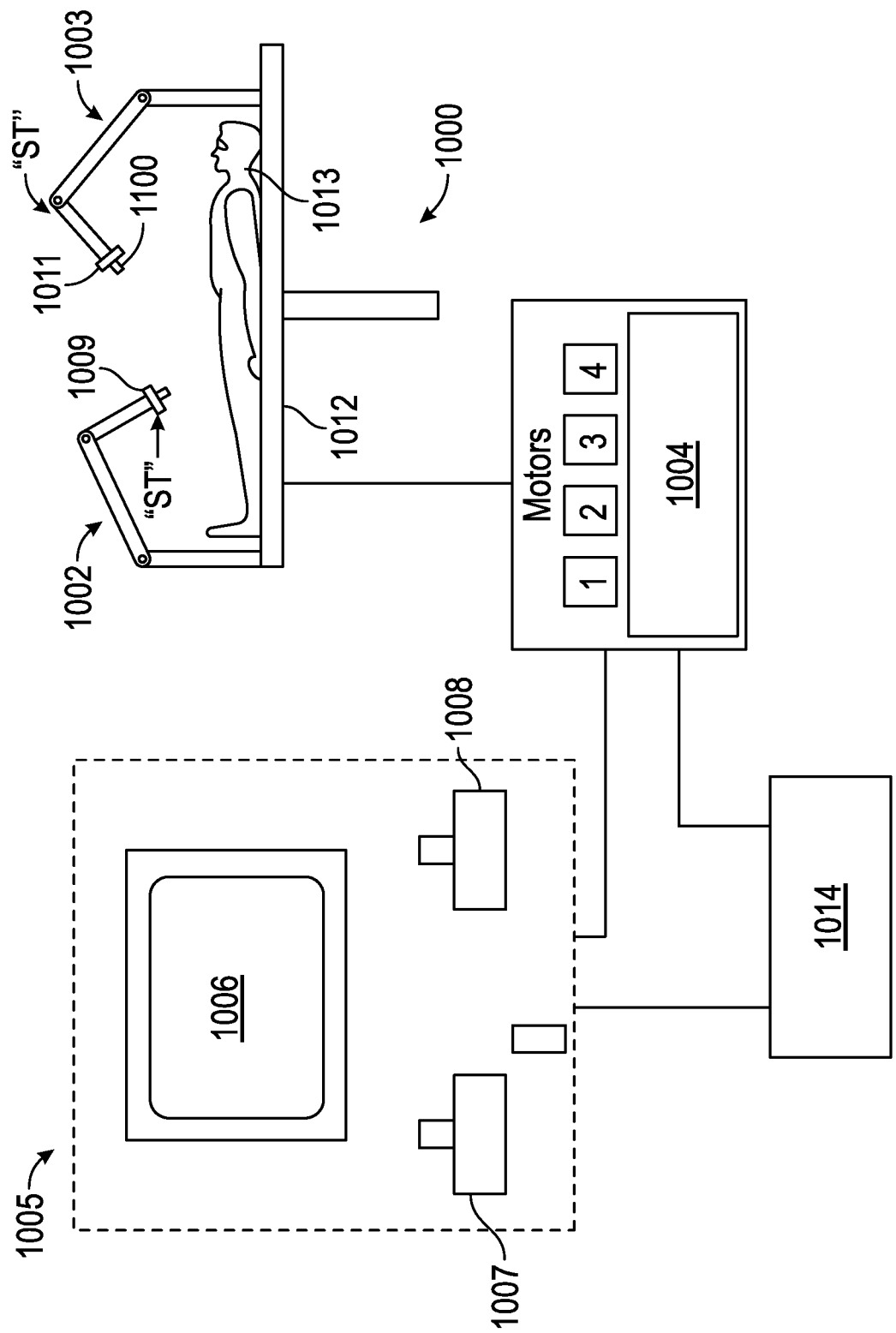
FIG. 18 is a diagram of a robotic surgical system in accordance with the present disclosure.

The disclosure and concepts described herein may be incorporated into a robotic surgical system, for example the robotic surgical system of FIG. 18. Various electromechanical surgical instruments and/or electrosurgical instruments, for example, endoscope 10 (FIG. 1) may be configured to be detachably coupleable and controllable by a robotic surgical system. One exemplary robotic surgical system may generally include a plurality of surgical robotic arms each having an instrument drive unit and the endoscope 10 removably attached thereto; a control device; and an operating console coupled with the control device.

The operating console includes a display device, which is set up in particular to display three-dimensional images; and manual input devices by means of which a person, for example, a surgeon, is able to telemanipulate the robotic arms in a first operating mode, as known in principle to a person skilled in the art. Each of the robotic arms may be composed of a plurality of members, which are connected through joints. The robotic arms may be driven by electric drives that are connected to the control device. The control device (e.g., a computer) is set up to activate the drives, in particular by means of a computer program, in such a way that the robotic arms, the attached instrument drive units, and thus the endoscope 10 execute a desired movement according to a movement defined by means of the manual input devices. The control device may also be set up in such a way that it regulates the movement of the robotic arms and/or of the drives.

The robotic surgical system is configured for use on a patient lying on a surgical table to be treated in a minimally invasive manner by means of the endoscope 10. The robotic surgical system may also include more than two robotic arms, the additional robotic arms likewise being connected to the control device and being telemanipulatable by means of the operating console. The endoscope 10 may also be attached to the additional robotic arm.

The control device may control a plurality of motors, with each motor configured to drive movement of the robotic arms in a plurality of directions. Further, the control device may control the activation of the instrument drive unit to drive various operations of endoscope 10, and may control a rotation of an internal motor pack of the instrument drive unit to ultimately rotate the endoscope 10 about a longitudinal axis thereof.

The robotic surgical system may further include a surgical instrument holder configured to be coupled with or to the robotic arm. The surgical instrument holder holds the instrument drive unit and the endoscope 10. The surgical instrument holder supports or houses a motor, which receives controls and power from the control device to effect a rotation of an internal motor pack of the instrument drive unit, which results in a rotation of the endoscope 10 about a longitudinal axis thereof. The surgical instrument holder may be slidably mounted onto a rail of the robotic arm and moved along the rail via a motor driven chain or belt or the like to adjust a position of the endoscope 10.

For a detailed description of the construction and operation of a robotic surgical system, reference may be made to U.S. Pat. No. 8,828,023, entitled "Medical Workstation," the entire contents of which are incorporated by reference herein.

With continued reference to FIG. 18, a robotic surgical system configured for use in accordance with the present disclosure is shown generally identified by reference numeral 1000. Aspects and features of robotic surgical system 1000 not germane to the understanding of the present disclosure are omitted to avoid obscuring the aspects and features of the present disclosure in unnecessary detail.

Robotic surgical system 1000 generally includes a plurality of robot arms 1002, 1003; a control device 1004; and an operating console 1005 coupled with control device 1004. Operating console 1005 may include a display device 1006, which may be set up in particular to display three-dimensional images; and manual input devices 1007, 1008, by means of which a person, e.g., a surgeon, may be able to telemanipulate robot arms 1002, 1003 in a first operating mode. Robotic surgical system 1000 may be configured for use on a patient 1013 lying on a patient table 1012 to be treated in a minimally invasive manner. Robotic surgical system 1000 may further include a database 1014, in particular coupled to control device 1004, in which are stored, for example, pre-operative data from patient 1013 and/or anatomical atlases.

Each of the robot arms 1002, 1003 may include a plurality of members, which are connected through joints, and an attaching device 1009, 1011, to which may be attached, for example, a surgical tool "ST." One or more of the surgical tools "ST" may include a DLU, e.g., DLU 100, similar to those detailed above, thus providing such functionality on a robotic surgical system 1000.

Robot arms 1002, 1003 may be driven by electric drives, e.g., motors, connected to control device 1004. Control device 1004, e.g., a computer, may be configured to activate the motors, in particular by means of a computer program, in such a way that robot arms 1002, 1003, their attaching devices 1009, 1011, and, thus, the surgical tools "ST" execute a desired movement and/or function according to a corresponding input from manual input devices 1007, 1008, respectively. Control device 1004 may also be configured in such a way that it regulates the movement of robot arms 1002, 1003 and/or of the motors.

The phrases "in an embodiment," "in embodiments," "in some embodiments," or "in other embodiments" may each refer to one or more of the same or different embodiments in accordance with the disclosure. A phrase in the form "A or B" means "(A), (B), or (A and B)." A phrase in the form "at least one of A, B, or C" means "(A); (B); (C); (A and B);

(A and C); (B and C); or (A, B, and C)." The term "clinician" may refer to a clinician or any medical professional, such as a doctor, nurse, technician, medical assistant, or the like, performing a medical procedure.

The systems described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, causes the one or more processors to perform one or more methods and/or algorithms.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Any of the herein described methods, programs, algorithms or codes may be contained on one or more machine-readable media or memory. The term "memory" may include a mechanism that provides (for example, stores and/or transmits) information in a form readable by a machine such a processor, computer, or a digital processing device. For example, a memory may include a read only memory (ROM), random access memory (RAM), magnetic disk storage media, optical storage media, flash memory devices, or any other volatile or non-volatile memory storage device. Code or instructions contained thereon can be represented by carrier wave signals, infrared signals, digital signals, and by other like signals.

It should be understood that the foregoing description is only illustrative of the disclosure. Various alternatives and modifications can be devised by those skilled in the art without departing from the disclosure. Accordingly, the disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A system for surgical mesh analysis, the system comprising:
   a display screen;
   a processor; and
   a memory having instructions stored thereon, which when executed by the processor, cause the system to:
   access an image of a surgical site, the image including the surgical mesh, wherein the surgical mesh includes a grid of cells;
   detect a first location on the surgical mesh in the image;
   detect a second location on the surgical mesh in the image;
   determine a distance between the first location and the second location along the surgical mesh in the image;
   display, on the display screen, the determined distance, and
   wherein when executing the instructions to determine the distance between the first location and the second location, the instructions further cause the system to at least one of:
   determine a number of cells of the grid of cells along a shortest distance between the first location and the second location;
   perform a Euclidean reconstruction based on analyzing the surgical mesh as a 3D structure composed of polygons, each polygon corresponding to a unique cell of the grid of cells; or
   perform a geodesic reconstruction based on analyzing the surgical mesh by forming a topographic map of the surgical mesh and calculating distances between the first desired location and the second desired location based thereon.

2. The system according to claim 1, wherein the image is obtained by an imaging device directed at the surgical mesh.

3. The system according to claim 1, wherein the accessed image includes at least one of a 2D image or a 3D image.

4. The system according to claim 1, wherein the instructions, when executed by the processor, further cause the system to identify an item located on the surgical mesh.

5. The system according to claim 4, wherein the item includes a tack, wherein the tack is configured for attaching the surgical mesh to a tissue.

6. The system according to claim 5, wherein the instructions, when executed by the processor, further cause the system to identify, based on the image, whether the surgical mesh is attached to the tissue by a tack located at a location along the surgical mesh.

7. The system according to claim 1, wherein the surgical site is at least one of a hernia surgical site or a laparoscopy surgical site.

8. The system according to claim 1, wherein the instructions, when executed by the processor, further cause the system to display on the display screen a pre-selected placement of tacks on the surgical mesh.

9. The system according to claim 1, wherein the instructions, when executed by the processor, further cause the system to:
   determine at least one placement location for at least one tack; and
   display the determined at least one placement location on the display screen.

10. A computer-implemented method for surgical mesh analysis, the method comprising:

accessing an image of a surgical site, the image including the surgical mesh, wherein the surgical mesh includes a grid of cells;

detecting a first location on the surgical mesh in the image;

detecting a second location on the surgical mesh in the image;

determining a distance between the first location and the second location along the surgical mesh in the image, wherein determining the distance between the first location and the second location further comprises at least one of:

determining a number of cells of the grid of cells along a shortest distance between the first location and the second location;

performing a Euclidean reconstruction based on analyzing the surgical mesh as a 3D structure composed of polygons, each polygon corresponding to a unique cell of the grid of cells; or performing a geodesic reconstruction based on analyzing the surgical mesh by forming a topographic map of the surgical mesh and calculating a distances between the first location and the second location based thereon; and displaying, on the display, the determined distance.

11. The computer-implemented method according to claim 10, further comprising using an imaging device directed at the surgical mesh to obtain the image.

12. The computer-implemented method according to claim 10, wherein the accessing of the image includes accessing at least one of a 2D image or a 3D image.

13. The computer-implemented method according to claim 10, further comprising identifying an item located on the surgical mesh.

14. The computer-implemented method according to claim 13, wherein the identifying of the item includes identifying a tack which is configured for attaching the surgical mesh to a tissue.

15. The computer-implemented method according to claim 14, further comprising identifying, based on the image, when the surgical mesh is attached to the tissue by a tack located at a location along the surgical mesh.

16. The computer-implemented method according to claim 10, further comprising determining a pre-selected placement of tacks on the surgical mesh.

17. The computer-implemented method according to claim 10, further comprising:

determining placement locations for one or more tacks; and displaying the determined placement locations.

* * * * *